Jan. 3, 1939.  E. H. MUELLER  2,142,368
VALVE STRUCTURE
Filed Sept. 27, 1937
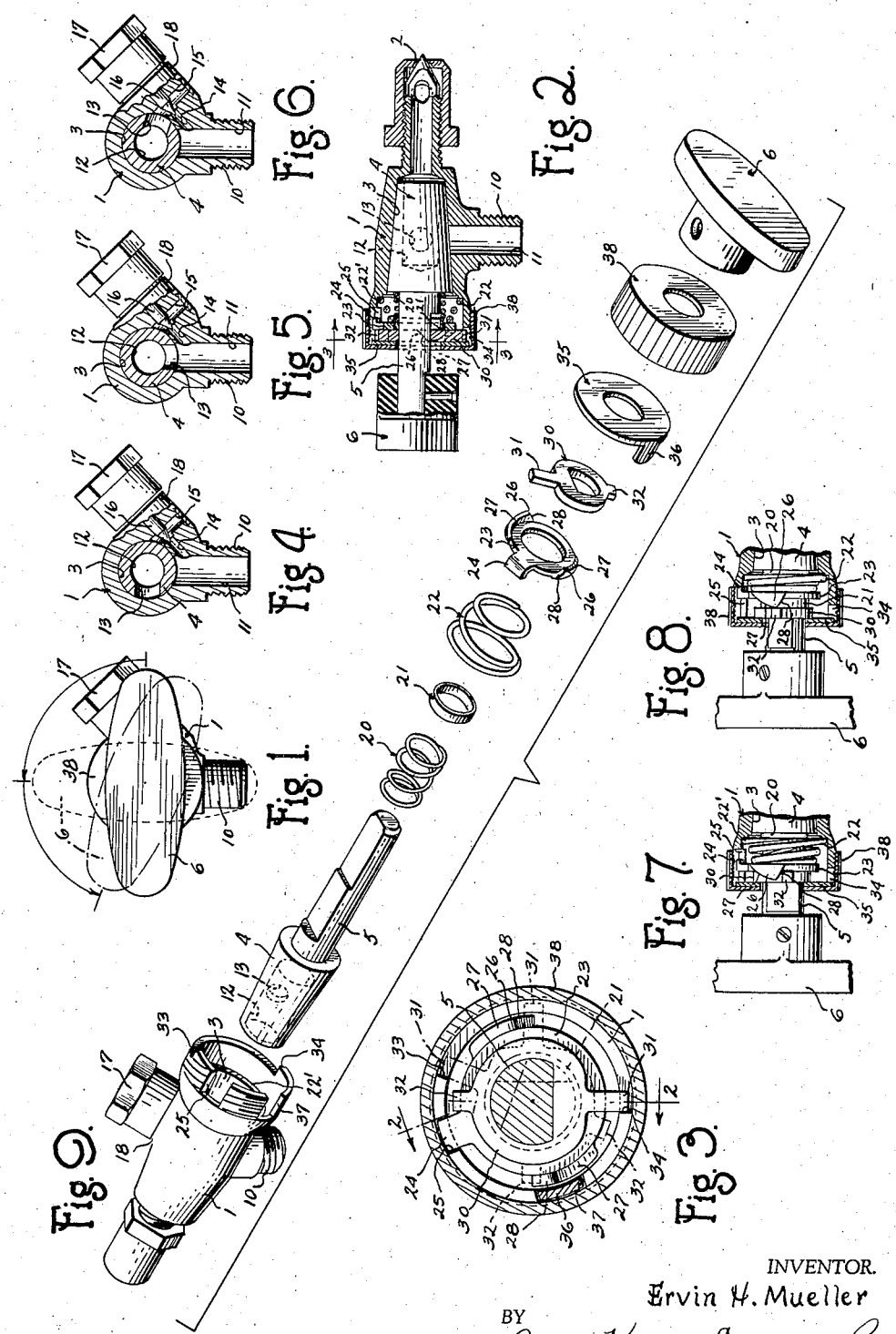
INVENTOR.
Ervin H. Mueller
BY Barnes, Kisselle, Laughlin & Raisch
ATTORNEYS Patented Jan. 3, 1939

2,142,368

UNITED STATES PATENT OFFICE 2,142,368

VALVE STRUCTURE

Ervin H. Mueller, Detroit, Mich.

Application September 27, 1937, Serial No 165,837

11 Claims. (Cl. 251—152)

This invention relates to a valve structure and has to do particularly with a valve structure suitable for use as a gas cock or the like.

The invention is directed particularly to a valve which will provide different controlled capacities, so that a full flow of gas may be obtained for a high or large flame, and a different flow of gas for a lower flow for providing a lower or simmering gas flame.

A valve with various port arrangements may be used as the invention is directed to an improved controlling structure. This structure is compact and provides a positive action, can be cheaply manufactured, lasts indefinitely, gives the valve a better appearance, employs a minimum number of parts, and is arranged to facilitate assembly.

One structure for carrying out the structure is illustrated in the accompanying drawing, wherein:

Fig. 1 is an elevational view of the valve showing particularly the handle movements.

Fig. 2 is a longitudinal cross sectional view taken substantially on line 2—2 of Fig. 3.

Fig. 3 is a sectional view taken substantially on line 3—3 of Fig. 2.

Fig. 4 is a cross sectional view of a valve illustrating the "off" position.

Fig. 5 is a cross sectional view similar to Fig. 2 illustrating the full "on" position.

Fig. 6 is a cross sectional view similar to Figs. 2 and 3 illustrating the low or simmering position.

Fig. 7 is a sectional view illustrating some of the control parts in full "on" position.

Fig. 8 is a view similar to Fig. 7 showing the operation of an intermediate stop device.

Fig. 9 is a view showing all of the parts in operating relation.

The valve has a body 1 provided with an outlet jet 2 from which the gas flows to a burner or the like, not shown. The body has a tapered bore 3 in which is positioned a tapered plug valve 4 having a stem 5 equipped with a handle 6. A portion of the stem may be flattened for the reception of the handle.

The valve body has a threaded projection 10 for connection to a gas manifold or gas pipe with a passageway 11 therethrough leading into the bore. The valve member has a bore 12 in the end opposite the stem, which leads to the outlet jet, and a port 13. The valve body has a passageway 14 leading off the passageway 11 and this passageway communicates with another passageway 15, closed at one end and leading into the bore in the valve body. The port 14 may be controlled by a needle valve member 16 arranged to constrict one end of the passageway 14. This needle valve is adjustable and access may be had thereto for adjusting purposes by the removal of a cap 17 screw threaded onto an extension 18 carried by the valve body and in which the stem 16 is mounted.

This particular valve structure, as thus far described, is disclosed and claimed in a separate application and illustrates one system of ports and gas passageways with which the present invention can be used. The needle valve 16 may be mounted upon screw threads for axial adjustment to control the capacity of the passageway 14. This is also shown in the separate application and need not be considered in more detail herein.

In Fig. 4 the valve is shown in full "off" position. When the valve is turned counter-clockwise to the Fig. 5 position, it is in full "on" position, the gas passing through the passageway 11, port 13 into the bore 12 and out through the jet 2. In the Fig. 6 position the valve is in simmering position, the passageway 11 being blocked off and the gas passing through passageway 14, passageway 15, port 13, and bore 12. This gives a relatively low flow of gas flow for a low flame which can be adjusted by the needle valve 16.

The several parts associated with the valve for exercising controlling actions on the valve member are illustrated in Fig. 9. There is a coil spring 20 arranged to fit over the stem and to abut against the end of the tapered plug 4. A sleeve 21 is arranged to slip over the stem and to engage the end of the coil spring 20. A coil spring of a frusto-conical formation is illustrated at 22 and it is arranged to slip over the stem and also over the spring 20 with its larger end making contact with a shoulder 22' of the valve body. A cam washer 23 is arranged to fit over the stem and to abut against the small end of spring 22, and it has a lug 24 arranged to be received in a slot 25 in the valve housing. This cam washer has two substantially diametrically oppositely positioned cam elements 26 each having a slow lift inclined face 27 and a quick lift face 28. This member 23 may be a stamping with the lug and cam elements suitably formed thereon. The lug 24 preferably is bent as illustrated so as to extend toward the slot 25 for facilitating assembly, as will presently appear.

A washer member 30 slips over the stem and has a D opening therein so that it is rotatably secured to the stem, whereas the washer member 23 is fixed against rotation by the connection 24—25 with the valve housing. The washer member 30 has a projection 31, and another projection 32, one being shorter than the other. The valve housing is cut away on one side to provide oppositely disposed abutments or stops 33 and 34 and the projection 31 operates between these stops. Also, the projections 31 and 32 function on the cam elements 26 as will presently appear. The collar 21 lies freely inside the spring 22 and washer 23, and reacts against the washer 30.

Another washer 35 is arranged to lie against the washer 30 and it has a tongue 36 arranged to be received in a milled slot 37 in the valve body. A cap 38 is arranged to be screw threaded onto the valve body, and finally the handle 6 is secured to the stem in any suitable manner.

Fig. 2 shows the parts in "off" position. The spring 20 reacts through the collar 21, washer member 30, washer member 35 and the cap 38 to hold the tapered plug valve on its seat with uniform pressure. When the valve is "off" the projection 31 lies against the stop 34, as illustrated in Fig. 3, where the washer 30 is shown in full lines. At this time the coil spring 22 holds the washers 23, 30 and 35 compacted against the cap 30. When the valve is turned counter-clockwise as Figs. 1 and 3 are viewed, the washer 30 moves with the valve but the cam washer 23 remains stationary. When in full "on" position (Fig. 5) the projections 31 and 32 strike the quick lift cam faces 28, as illustrated by the dotted lines in Fig. 3. These cam faces are such as to serve as substantial stops, thus normally stopping the valve in full "on" position. The valve may be operated from "off" to "on" with the projection 31 functioning on the fixed stop 34, and both projections functioning on the quick lift cams 28.

In order to move the valve to simmering position as shown in Fig. 6, additional turning effort must be applied to move the projections 31 and 32 over the cams. Fig. 7 shows the parts in full "on" position; Fig. 8 shows the parts just as they are riding over the cams. The two projections 31 and 32 balance, so to speak, the axial shift of the cam washer against the spring 22. This shift is illustrated in Fig. 8. As this turning motion of the valve continues the projection 31 may ultimately contact with the shoulder 33 as shown by the dot and dash lines in Fig. 3. The valve is now in simmering position illustrated in Fig. 6.

The parts in Fig. 9 are shown in the position which they substantially assume when the valve is turned to simmering position. It will be noted that the projection 32 is relatively short and lies inside the threaded extension of the valve body so that its only function is that of acting on one of the cams 26. The projection 30 lies in the milled slot between the shoulders 33 and 34, and serves to limit the extreme movements of the valve. When the valve is to be turned off from simmering position the projections 31—32 ride easily past the cams, functioning on the slow lift faces. This is accomplished without any substantial or noticeable requirement for increasing turning torque. To the contrary, when the valve is turned so that the projections strike the quick lift cam faces, a substantial stopping action is obtained and a noticeable increase in turning torque is necessary to turn the valve further.

In making the assembly the several parts shown in Fig. 9 are assembled on the stem and normally, of course, the spring 22 is extended. In order to properly position the cam washer 23 at this time, its key member 24 is bent as shown so as to extend toward the valve body, so that it will lie partly in the slot 25 even when the spring 22 is extended. When the assembly is tightened by screwing the cap 38 into position, the cam washer 23 slides axially toward the tapered plug and the springs are compressed. In the normal use of the valve the washer 30, of course, turns with the valve, and in order to prevent this turning action from tending to loosen the cap 38 on its screw threads the washer 35 is provided with an extension 36 which is keyed to the valve body. Therefore, any turning movement of the valve plug causes the washer 30 to frictionally rotate on the washer 35, and there is no tendency to unscrew the cap.

It will be observed that the spring 20 is not flexed in the action of turning the valve on and off. The spring 22 is flexed in this action but it reacts against the valve body. Therefore, the spring tension or force which holds the tapered valve plug on its seat is not varied but remains substantially constant. The cam washer 23 lies over the sleeve 21 as shown in Fig. 2. The sleeve 21 serves as a pilot for the cam washer in its longitudinal movements.

This arrangement of washers, etc., makes it possible to select a more or less standard valve structure which uses a spring between the cap and valve member and by merely adding a few parts the control feature is provided. Cross pins or other similar structures on the stem are not needed. The operations in providing a cross pin are eliminated. The member 32 provides a flat surface as distinguished from a line contact theoretically provided by the pin, and this gives greater life and wearing qualities.

I claim:

1. In a valve for gas cocks or the like, a body having a seat, a valve member on the seat and rotatable relative to the body, said valve member having a stem, a cap secured to the body and through which the stem extends, a spring around the stem, a washer member through which the stem extends and keyed to the valve member, a projection on said washer member, abutments on the body against which the projection is adapted to abut for limiting rotary movement of the valve member, a second washer through which the stem extends and keyed to the body, said second washer having a stopping part located in an intermediate position relative to the abutments, said spring acting upon the second washer and being ineffective on the valve member, said stopping part having a quick lift cam face on one side, said abutments serving to stop the valve in "off" position and one "on" position and the quick lift cam face serving as an intermediate stop for the said projection for determining a second "on" position, said washer members lying against each other and said washer members and spring being confined between the valve member and cap with the spring compressed whereby the washers may separate by spring flexure as the projection rides over the stopping part.

2. In a valve for gas cocks or the like, a body having a seat, a valve member on the seat and rotatable relative to the body, said valve member having a stem, a cap secured to the body and through which the stem extends, a spring around the stem, a washer member through which the stem extends and keyed to the valve member, a projection on said washer member, abutments on the body against which the projection is adapted to abut for limiting rotary movement of the valve member, a second washer through which the stem extends and keyed to the body, said second washer having a stopping part located in intermediate position relative to the abutments, said spring acting upon the second washer and being ineffective on the valve member, said stopping part having a quick lift cam face on one side and a slow lift cam face on its opposite side, said abutments serving to stop the valve in "off" position and one "on" position and the quick lift cam face serving as an intermediate stop for the said projection for determining a second "on" position, said washer members lying against each other and said washer members and spring being confined between the valve member and cap with the spring compressed whereby the washers may separate by spring flexure as the projection rides over the stopping part.

3. A valve for gas cocks or the like comprising a body having a seat, a valve member rotatable on the seat between extreme positions, one of which is off and one of which is on, said valve member having a stem, a cap secured to the valve body and through which the stem extends, means comprising a spring acting upon the valve member and reacting on the cap for holding the valve member on its seat, a washer member non-rotatably fixed to the stem and having a projection, stops on the valve body for determining the extreme rotary positions of the valve member by the engagement of said projection therewith, a second washer member keyed to the valve body and having a part located in the path of said projection and disposed between the said stops, said part having a surface on one side arranged to engage the projection with a substantial stopping action for stopping the valve member in an intermediate "on" position and having a slow lift cam face on its opposite side past which the projection may ride easily, another spring acting upon the second washer member and reacting against the valve body and arranged to flex for shift of the second washer member as the projection rides over said part.

4. A valve for gas cocks or the like comprising a body having a seat, a valve member rotatable on the seat between extreme positions, one of which is off and one of which is on, said valve member having a stem, a cap secured to the valve body and through which the stem extends, said body having a recess forming a chamber closed by said cap, spaced stops on the body member, two washer members and two springs all surrounding the stem and located in said chamber, one of said washers being keyed to the stem and having a projection arranged to engage the stops for limiting extreme rotary positions of the valve member, the other washer being keyed to the body and having a part lying intermediate the said stops and in the path of the projection, one spring reacting against the cap and the valve member for holding the valve member on its seat, the other spring reacting against the body member and the second washer member and which is flexed as the projection moves past said part with incident shift of the second washer.

5. A valve for gas cocks or the like comprising a body having a seat, a valve member rotatable on the seat between extreme positions, one of which is off and one of which is on, said valve member having a stem, a cap secured to the valve body and through which the stem extends, said body having a recess forming a chamber closed by said cap, spaced stops on the body member, two washer members and two springs all surrounding the stem and located in said chamber, one of said washers being keyed to the stem and having a projection arranged to engage the stops for limiting extreme rotary positions of the valve member, the other washer being keyed to the body and having a part lying intermediate the said stops and in the path of the projection, one spring reacting against the cap and the valve member for holding the valve member on its seat, the other spring reacting against the body member and the second washer member and which is flexed as the projection moves past said part with incident shift of the second washer, said washers being disposed in face to face relation and said springs being coil springs and one disposed within the other.

6. A valve for gas cocks or the like comprising a body having a seat, a valve member rotatable on the seat between extreme positions, one of which is off and one of which is on, said valve member having a stem, a cap secured to the valve body and through which the stem extends, said body member having a recess closed by said cap to form a chamber, spaced stops on the body member, a washer member lying against the inside face of the cap and keyed to the stem and having a projection for engaging the stops to limit extreme rotary positions of the valve member, a collar surrounding the stem and abutting against said washer, a coil spring surrounding the stem and disposed between the collar and the valve member for holding the valve member on its seat, a second washer member around the collar and keyed to the body member, a coil spring positioned between the second washer member and the valve body and normally holding the two washer members against each other, said second washer member having a part positioned in the path of said projection and located in an intermediate position as regards the two stops, said part serving to engage the projection and to exert a stopping action against the rotary movement of the valve member for determining an intermediate "on" position of the valve, said second washer member being shiftable against the action of the second spring as the projection moves over said part.

7. A valve for gas cocks or the like comprising a body having a seat, a valve member rotatable on the seat between extreme positions, one of which is off and one of which is on, said valve member having a stem, a cap secured to the valve body and through which the stem extends, said body member having a recess closed by said cap to form a chamber, spaced stops on the body member, a washer member lying against the inside face of the cap and keyed to the stem and having a projection for engaging the stops to limit extreme rotary positions of the valve member, a collar surrounding the stem and abutting against said washer, a coil spring surrounding the stem and disposed between the collar and the valve member for holding the valve member on its seat, a second washer member around the collar and keyed to the body member, a coil spring positioned between the second washer member and the valve body and normally holding the two washer members against each other, said second washer member having a part positioned in the path of said projection and located in an intermediate position as regards the two stops, said part serving to engage the projection and to exert a stopping action against the rotary movement of the valve member for determining an intermediate "on" position of the valve, said second washer member being shiftable against the action of the second spring as the projection moves over said part, said part having a quick lift cam face on one side for exerting a substantial stopping action as the projection engages the same and having a slow lift cam face on its opposite side and over which the projection may move without a substantial increase in the torque necessary to turn the valve member.

8. A gas cock comprising, a body member having a seat, a valve member rotatable on the seat, said body member being recessed, a cap for closing the recess to thereby form a chamber, said valve member having a stem extending through the recess, two washer members and two coil springs located in the chamber, one washer member being keyed to the valve stem and having a projection, the other washer member being keyed to the valve body and having a projection, spaced stops on the body member with which the projection on the first washer member engages to limit the rotation of the valve member, the projection on the second mentioned washer member lying in the path of the first projection and intermediate the two stops and serving as an intermediate stop, one of the coil springs acting upon the valve member and reacting against the cap for holding the valve member on its seat with a substantially constant spring pressure, the other coil spring acting upon the second washer member and reacting against the valve body and arranged to flex to permit axial movement of the second washer member as one projection is moved past the other without increasing the pressure with which the valve member is held on its seat.

9. A gas cock comprising, a body member having a seat, a valve member rotatable on the seat, said body member being recessed, a cap for closing the recess to thereby form a chamber, said valve member having a stem extending through the recess, two washer members and two coil springs located in the chamber, one washer member being keyed to the valve stem and having a projection, the other washer member being keyed to the valve body and having a projection, spaced stops on the body member with which the projection on the first washer member engages to limit the rotation of the valve member, the projection on the second mentioned washer member lying in the path of the first projection and intermediate the two stops and serving as an intermediate stop, one of the coil springs acting upon the valve member and reacting against the cap for holding the valve member on its seat with a substantially constant spring pressure, the other coil spring acting upon the second washer member and reacting against the valve body and arranged to flex to permit axial movement of the second washer member as one projection is moved past the other without increasing the pressure with which the valve member is held on its seat, one of said projections having a quick lift cam face for providing a substantial stopping action past which the other projection may be moved by a substantial increase in turning torque, and having a slow lift cam face on its opposite side past which the other projection may be moved without substantial increase in turning torque.

10. In a valve for gas cocks or the like comprising, a body member, a turnable valve member, a stem on the valve member, a cap through which the stem extends and secured to the valve member, a spring surrounding the stem and acting on the valve member and reacting on the cap for holding the valve member on its seat, a washer member keyed to the valve body and having opposite cam members, another washer member arranged to rotate with the stem, a spring reacting on the body holding the washer members against each other with the force reacting against the cap, two projections on the second washer member for cooperation with the cams on the first washer member, one of said projections being relatively long, the valve body having a groove for the reception of the long extension, shoulders at the ends of the groove with which the long projection contacts for limiting the extreme movements of the valve member in "off" and "on" positions, said cams being located in a position to engage the projections intermediate said stops on the body member for locating the valve in an intermediate "on" position.

11. In a valve for gas cocks or the like comprising, a body member, a turnable valve member, a stem on the valve member, a cap through which the stem extends and secured to the valve member, a spring surrounding the stem and acting on the valve member and reacting on the cap for holding the valve member on its seat, a washer member keyed to the valve body and having opposite cam members, another washer member arranged to rotate with the stem, a spring reacting on the body holding the washer members against each other with the force reacting against the cap, two projections on the second washer member for cooperation with the cams on the first washer member, one of said projections being relatively long, the valve body having a groove for the reception of the long extension, shoulders at the ends of the groove with which the long projection contacts for limiting the extreme movements of the valve member in "off" and "on" positions, said cams being located in a position to engage the projections intermediate said stops on the body member for locating the valve in an intermediate "on" position, and a third washer keyed to the valve body lying between the second washer and cap whereby turning movements of the second washer are not transmitted to the cap.

ERVIN H. MUELLER.